United States Patent [19]

Fujii et al.

[11] Patent Number: 4,658,275

[45] Date of Patent: Apr. 14, 1987

[54] IMAGE FORMING APPARATUS

[75] Inventors: Haruo Fujii; Yujiro Ando, both of Yokohama, Japan

[73] Assignee: Canon Kabushiki Kaisha, Tokyo, Japan

[21] Appl. No.: 713,559

[22] Filed: Mar. 19, 1985

[30] Foreign Application Priority Data

Mar. 23, 1984 [JP] Japan .................................. 59-55661
Mar. 30, 1984 [JP] Japan .................................. 59-62961
Apr. 13, 1984 [JP] Japan .................................. 59-74770
Nov. 16, 1984 [JP] Japan .................................. 59-242045

[51] Int. Cl.[4] .............................................. G01D 15/06

[52] U.S. Cl. .................................... 346/154; 400/119; 346/155

[58] Field of Search ................ 346/159, 155; 358/300; 400/119; 101/DIG. 13

[56] References Cited

U.S. PATENT DOCUMENTS 3,816,840 6/1974 Kotz ............................... 346/74 ES
4,160,257 7/1974 Carrish ................................ 346/159

*Primary Examiner*—Arthur G. Evans
*Attorney, Agent, or Firm*—Fitzpatrick, Cella, Harper & Scinto

[57] ABSTRACT

An image information signal is applied to an ion generator, which generates ions in accordance with the image information signal and extracts the ions to deposit them on one side of an image bearing member. An electric charge having the polarity opposite to that of those ions is injected into toner particles, so that the toners are deposited onto the other side of the image bearing member by the attraction force with the ions, and therefore, an image is formed on the image bearing member in accordance with the image information. The ion generator includes a first electrode, a second electrode, a third electrode so disposed that the second electrode lies between the first electrode and the third electrode, a first dielectric member between the first electrode and the second electrode, a second dielectric member between the second electrode and the third electrode. The second dielectric member and the third electrode are provided with plural apertures. By applying alternating potential between the first electrode and the second electrode, the ion generator generates positive and negative ions in the apertures. Between the second electrode and the third electrode, a bias voltage is applied in accordance with the image information so that the ions having a polarity determined by the polarity of the bias voltage are extracted from the positive and negative ions.

15 Claims, 8 Drawing Figures

IMAGE FORMING APPARATUS

BACKGROUND OF THE INVENTION

The present invention relates to an image forming apparatus wherein an image signal corresponding to image information is applied to an electrode member, so that developer is directly deposited on an image bearing member, thus forming image information on the image bearing member in accordance with the image information, and to an image forming apparatus wherein the thus formed image is displayed for allowing the operator to observe the same.

As for an image forming apparatus of this type, a so-called contrography is known. In this method, an insulating film having a high electric resistance is used for a recording medium, which is moved and to which a recording electrode is closely opposed at the backside thereof. Onto the front side of the film conductive toner particles are contacted which are carried on a developing member. A recording signal voltage is applied to the recording electrode in accordance with the image information so that the toner particles are deposited on the recording medium, thus forming the image.

An example of the apparatus of this type is disclosed in Japanese Laid-Open Patent Application No. 105758/1982, which is schematically shown in FIG. 1. The recording medium made of an insulating material is movable in the direction shown by an arrow A. To the backside of the recording medium 2, the recording electrode 2 is disposed closely opposed thereto, which includes a number of needle electrodes electrically isolated from each other and arranged in the direction of the width of the recording medium. To the respective needle electrodes of the recording electrode 2, signal voltages corresponding to the image information are independently applied from a signal generator 3. A developing device 4 is disposed across the recording medium 1 from the recording electrode 2. That is, the develping device 4 is located to the frontside of the recording medium 1. The developing device 4 includes a rotatable sleeve 5 which is a hollow cylinder of non-magnetic and conductive material, and includes a stationary magnet 6 therein. The sleeve 5 is contacted to the conductive and magnetic toner particles T contained in the toner hopper 7. When the sleeve 5 rotates in the direction shown by an arrow B, the toner particles T are carried on the surface of the sleeve 5 to be brought into contact with the recording medium 1. Then, the toner particles T function as an opposite electrode of the recording electrode 2. Therefore, electric discharge takes place between the recording medium 1 and tip end of the recording electrode 2 to which the recording signal voltages are applied, whereby an electric charge appears on the recording medium 1, and simultaneously an electric charge of the opposite polarity is injected to the toner particles T from the conductive sleeve 5. The electric attraction force between those electric charges having opposite polarities retains the toner particles T on the recording medium 1, thus providing a visualized image.

However, this type of apparatus requires that a very fine clearance, several microns–several tens of microns, has to be maintained between the needle electrodes and the recording medium 1. This is very difficult to achieve uniformly over the full span of the recording medium width.

Therefore, an improvement is required in this type of apparatus.

SUMMARY OF THE INVENTION

Accordingly, it is a principal object of the present invention to provide an image forming apparatus which is substantially free from the above-described drawbacks.

It is another object of the present invention to provide an image forming apparatus wherein an image can be written in and erased out.

It is a further object of the present invention to provide an image forming apparatus wherein the formed image can be displayed and can be observed by an operator.

It is a further object of the present invention to provide an image forming apparatus by which sharp and clear image can be formed without a foggy background.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
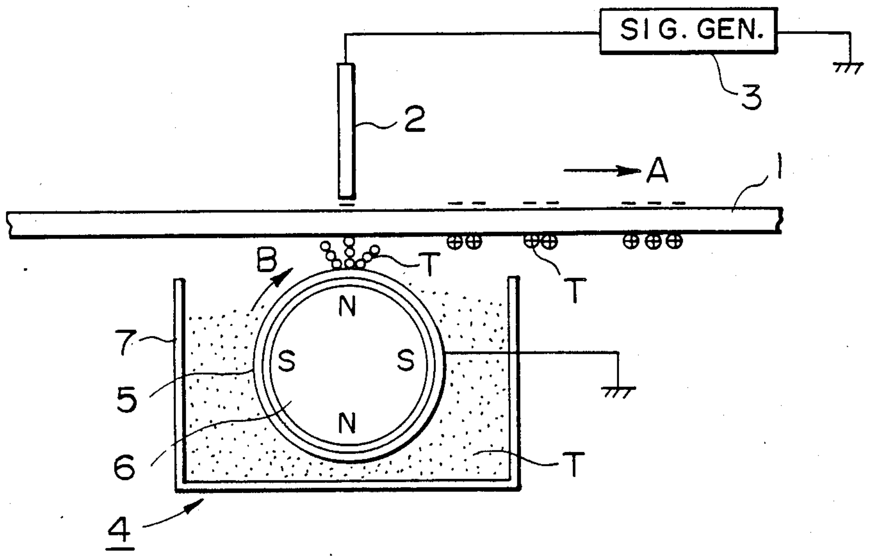
FIG. 1 is a cross-sectional view of an image forming apparatus.
Figure 2:
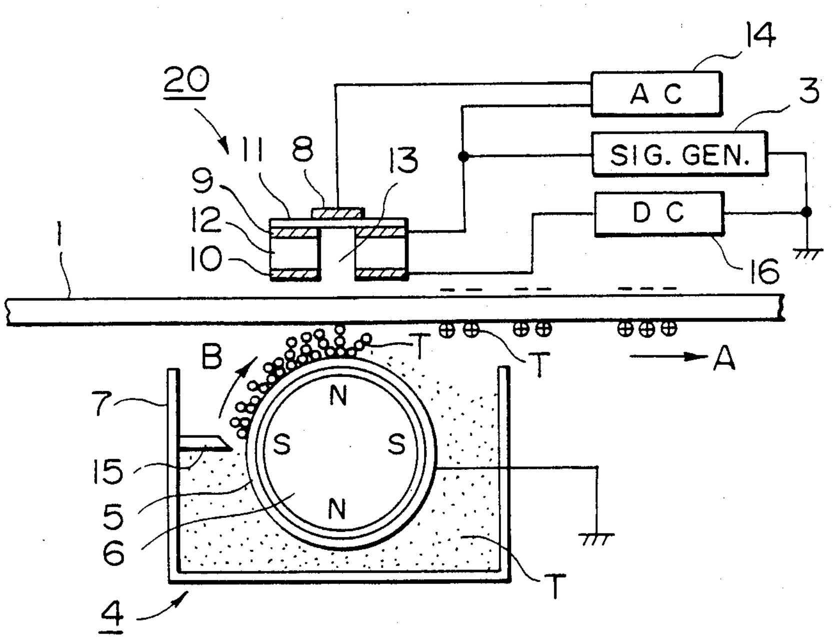
FIG. 2 is a cross-sectional view of an image forming apparatus according to an embodiment of the present invention.

Referring now to FIG. 2, there is shown an image forming apparatus according to a first embodiment of the present invention, wherein the same reference numerals as in FIG. 1 are assigned to those elements having the corresponding functions.

In FIG. 2, the apparatus includes a recording electrode assembly 20 which comprises a first electrode 8, second electrodes 9, a third electrode 10, a first dielectric member 11 between the first electrode 8 and the second electrodes 9 and a second dielectric member 12 between the second electrodes 9 and the third electrode 10. The second electrodes 9, the second dielectric member 12 and the third electrode 10 are provided with apertures 13 in alignment with each other. The recording electrode assembly 20 is closely opposed to the recording medium 1 which functions as an image bearing member, and extends over the entire width thereof. The apertures 13 are arranged in the direction of the width of the recording member 1, that is, perpendicularly to the movement of the image bearing member. A number of the apertures 13 are provided. The second electrodes 9 constitute a group of electrodes, the number of which corresponds to the number of the apertures 13, the electrodes in the group being independent from each other. To the individual electrodes, signal voltage is applied from the image signal generator 3 in accordance with the image information. FIG. 2 is a cross-section of a part of the recording electrode assembly 20 where only one line of apertures 13 exists.

Between the first electrode 8 and the second electrodes 9, an alternating voltage is selectively applied by an alternating power source, which causes electric discharge between the first dielectric member 11 and the exposed surface of the second electrodes 9, thereby generating positive and negative ions in the aperture 13. By applying the signal voltage, potential inclination is created between the second electrodes 9, the third electrode 10 and the sleeve 5 (grounded in this embodiment), by which the ions of either one of the polarities are moved to the recording medium 1. By doing so, an electrostatic latent image is formed on the recording medium 1 in accordance with the image information. To the third electrode 10, a constant voltage is applied from a DC power source 16.

Simultaneously, the electric charge is injected to the toner particles T through the sleeve 5, the electric charge having the polarity opposite to that of the ions deposited on the recording medium 1, so that the toner particles T are retained on the recording medium by the electrostatic attraction force between itself and the ions, thus a toner image is formed on the recording medium corresponding to the image information.

When the toner particles T thus deposited are to be removed at a later stage, that is, when the image is to be erased, the electric charge on the recording medium 1 is erased. To accomplish this, the same electric potential is established at the second electrodes 9, at the third electrode 10 and at the sleeve 5. When this is done, the recording medium 1 electrostatically attracts the ions which have the polarity opposite to that of the electrostatic image charge on the recording medium 1 from the positive and negative ions within the aperture 13. By this, the electric charge on the recording medium 1 is removed. Simultaneously therewith, the electric charge injected into the toner T flows back to the ground through the sleeve 5, with result of no electrostatic attraction force between the toner T and the recording medium 1. Then, the toner is collected into the toner hopper 7 by the magnetic force provided by the magnet 6, and it will be reused.

If the image is formed during the recording medium 1 moving in the direction shown by the arrow A, and the image is erased during the recording medium 1 moving in the opposite direction, then the toner image can be freely written on and erased out of the recording medium 1. As for the erasing of the image, it cannot be performed when the recording medium is moved in the opposite direction. More particularly, the recording medium 1 may be in the form of an endless belt, and the image is erased after one full turn of the image, while the belt is rotating in the same direction. In this specification, such a means as described above, which generates ions for the image recording or the image erasing, is called "an ion generating device".

Heretofore, the description has been made with respect to one array of the apertures 13 extending perpendicularly to the movement of the recording medium 1. However, a plurality of the arrays may be employed in order to increase the recording density, thus constituting a matrix by the combination of the first electrodes 8 and the second electrodes 9.

Figure 3:
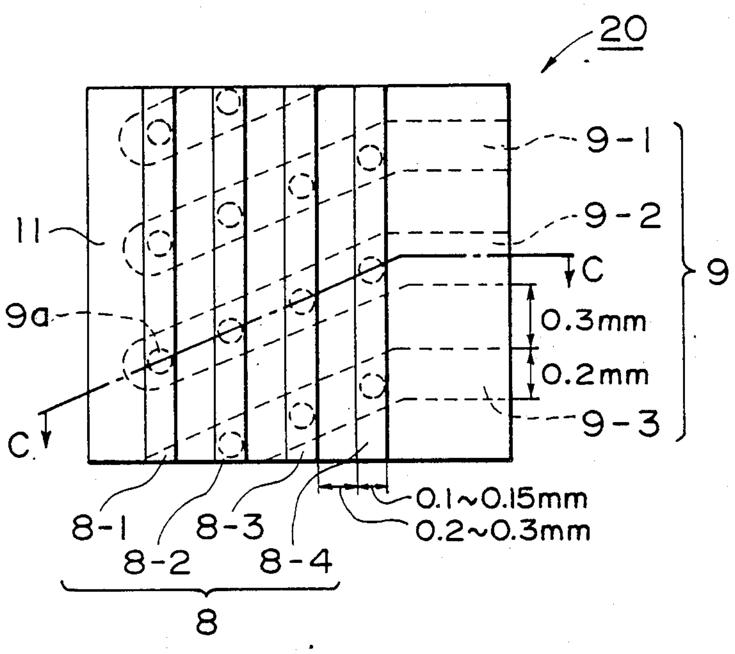
FIG. 3 is a plan view of an ion generating device used with the image forming apparatus of FIG. 2.

A second embodiment of the present invention will be described in conjunction with FIG. 3 and 4, wherein the recording electrode assembly 20 includes a plurality of the first electrodes to form a matrix with the second electrodes 9. FIG. 3 is a plan view of the recording electrode assembly 20 seen from the first electrode (8) side, and FIG. 4 is a cross-sectional view taken along line C—C of FIG. 3.

Figure 4:
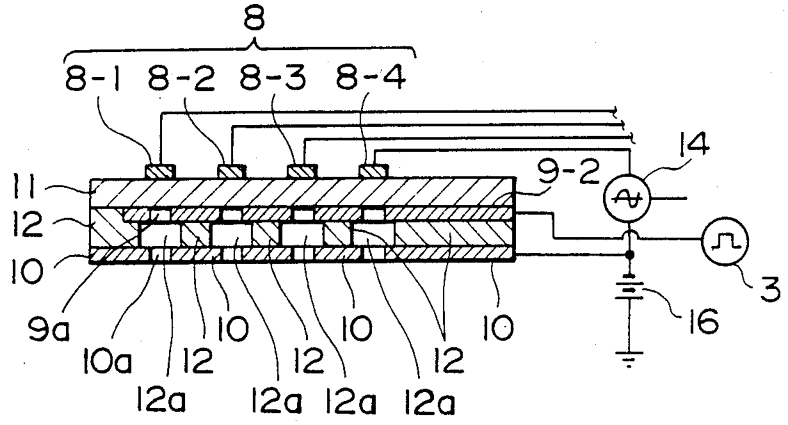
FIG. 4 is a cross-sectional view taken along lines C—C in FIG. 3.

The recording electrode assembly as shown in FIGS. 3 and 4, comprises first electrodes (driver electrodes) 8-1, 8-2, 8-3, 8-4 ... extending in a first direction, and a plurality of second electrodes (finger electrodes) 9-1, 9-2, 9-3, 9-4 ... extending in a second direction which is different from and substantially transverse to the first direction. A shown in FIG. 3, those electrodes constitute a matrix. A third electrode 10 is so provided that the second electrodes 9 lie between the first electrodes 8 and the third electrode 10. The third electrode 10 is provided with a number of apertures **10*a* corresponding to the cross-over points of the matrix. Between the first electrodes 8 and the second electrodes 9 is interposed a first dielectric member 11, and between the second electrodes 9 and the third electrode 10 is interposed a second dielectric member 12. The second dielectric member 12 is provided with apertures 12*a* corresponding to the apertures 10*a* of the third electrode 10**.

In the ion generating device having the above-described structure, when an alternating voltage is selectively applied between the plural first electrodes 8 and the plural second electrodes 9, the positive and negative ions are produced in the aperture **9*a* at the selected cross-over point or points of the matrix. A signal voltage is applied to the selected one of the second electrode 9 from an image signal generator 3, and a bias voltage is applied between the second electrode 9 and the third electrode 10. Then, only the ions that have the polarity determined in dependence of the polarity of the above voltage are extracted from the positive and negative ions. Those extracted ions are allowed to pass through the aperture 12*a* and the aperture 10*a* to the recording medium 1**, to which the ions are deposited.

If, therefore, the above-described ion generating device is replaced with the ion generating device of FIG. 2 so that the plural first electrodes 8 and the plural second electrodes 9 are selectively driven in accordance with the image information, a higher density image recording can be accomplished on the recording medium 1. In order to erase the image, the similar operation as described with respect to FIG. 2 may be used.

In the ion generating device described above, the apertures **12*a* of the second dielectric member 12 may be communicated with adjacent ones to form a slit or an elongated aperture. In the foregoing, the third electrode 10 has been described as being a single plate electrode having a plurality of the apertures 10*a* corresponding to the matrix, but the third electrode 10 may be constructed by a plurality of finger electrodes as in the second electrodes 9. Further, in order to improve the electrical isolation of the first electrodes 8**, it is preferable to cover them with an insulating material, which is not shown.

Further description will be made with respect to the matrix type ion generating device. As for the recording medium 1, a preferable material is the dielectric film of, for example polyester, polyethylene or polyvinyl chloride or the like, which has a resistance not less than $10^{10}$ ohm.cm and has a high tensile strength. The thickness thereof is 1-500 microns. However, in order to improve the resolution, the thinner the better, but in order to increase the tensile strength, a thick one is desired. In this embodiment, polyester film of 25 microns thickness was used.

As for the material of the first electrodes 8 and the second electrodes 9 and the third electrode 10, stainless steel foil of 20 microns thickness was used for the respective electrodes. The thickness of the first dielectric member 11 is correlated with the output voltage of the AC power source 14. Lower discharging voltage can be obtained with the decrease of the thickness. In this embodiment, a mica plate of 100 microns thickness was used for the first dielectric member 11. As for the second dielectric member 12, ceramics of 100 microns thickness was used. Besides those materials for the dielectric members, there are other usable materials, such as inorganic material, e.g. glass and organic materials, e.g. a high polymer such as polyimide or the like. The size of the aperture 10*a* of the third electrode 10 was approximately 100 microns. The ion generating device of the above-described dimension, structure and material was opposed to the recording medium 1 so that the clearance between the third electrode 10 thereof and the recording medium 1 was 0.2 mm.

Across the recording medium 1 from the ion generating device, a developing device 4 is disposed, which includes a toner hopper 7, a rotatable sleeve 5 and a stationary magnet 6. The sleeve 5 is contacted to the conductive and magnetic toner particles T within the toner hopper 7. The sleeve 5 is rotatable in the direction shown by the arrow B by an unshown driving source. When it is rotated, a layer of toner particles T having a thickness regulated by a non-magnetic doctor blade 15, is formed on the sleeve 5. The sleeve 5 was made of a stainless steel cylinder having the diameter of 22 mm. The magnet 6 provided within the sleeve 5 had 4 magnetic poles magnetized to the same extent to provide surface magnetic flux density of 460 Gauss on the sleeve (5) surface. The sleeve 5 was rotated in the direction of the arrow B at a rotational speed of 64 r.p.m. The clearance between the recording medium 1 and the sleeve 5 was set to be 0.5 mm. As for the toner T, it is preferable that the resistance thereof is not more than $10^{10}$ ohm.cm and it is magnetic. In this embodiment, 355 Imaging Powder available from 3M Co., U.S.A. was used.

With the above-described dimension, structure and material, the recording medium 1 was moved in the direction of the arrow A at a speed of 180 mm/sec. An AC voltage having the frequency of 500 KHz and the peak-to-peak voltage of 2.5 $KV_{p-p}$ was applied between the first electrodes 8 and the second electrodes 9 by the AC power source 14. To the second electrodes 9, −700 V is applied by the image signal generator 3 when the image signal is produced, −400 V when no image signal is produced. More particularly, regarding the portions where the image is to be formed, −700 V is applied to the second electrode 9 and regarding the non-image area, −400 V is applied to the second electrodes 9. The voltage value is based on the potential of the sleeve 5 (grounded) to the third electrode 10, −400 V is always applied by the DC power source 16. The voltage applied to the third electrode 10 is such that it has the same polarity as that applied to the second electrodes 9, or it is 0 V (ground). It is preferable that the absolute value thereof is smaller than the voltage applied to the second electrodes 9 when the image signal exists.

Thus, when the signal voltage is applied to the second electrodes 9 in accordance with the image information, the ions (negative ions in this embodiment) are deposited on the recording medium 1 whereby an electrostatic latent image is formed. Simultaneously therewith, the electric charge of the opposite polarity (positive in this embodiment) is injected into the toner T through the sleeve 5. The electrostatic attraction force created between the ions and the toner T is effective to attract the toner to the recording medium 1 and to retain the toner, thus forming a visualized toner image on the recording medium 1. When there is no image signal, the second electrode 9 is maintained at −400 V, so that there is no potential difference between the second electrode 9 and the third electrode 10. Therefore, the ions do not pass through the aperture 10*a* with the result of no ions deposited on the recording medium. Hence, no deposition of the toner on the recording medium 1 takes place.

When the toner T is to be removed from the recording medium 1, the AC voltage is applied between the first electrodes 8 and the second electrodes 9, and the same electric potential (ground in this embodiment) is established at the second electrodes 9, the third electrode 10 and the sleeve 5. By doing this, the ions having the polarity opposite to that of the electric charge of the electrostatic latent image deposited on the recording medium 1 are attracted toward the recording medium 1 out of the positive and negative ions produced by the application of the AC voltage. In this embodiment, the negative charge has been deposited on the recording medium 1, as described hereinbefore, to form an image and therefore, the positive ions are attracted toward the recording medium 1 with the result that the positive ions attenuate with the negative charge of the image to erase the electric charge forming an image on the recording medium. Simultaneously, the electric charge which has been injected into the toner T flows back into the sleeve 5. This extinguishes the electrostatic attraction between the toner T and the recording medium. Then, the toner T is attracted by the magnetic force created by the magnet 6 and collected into the toner hopper 7.

In the foregoing, the erasing of the image has been described a grounding the second electrodes 9 and the third electrode 10. However, an AC voltage may be applied to the second electrodes 9, which AC voltage has the same phase as of the AC voltage provided by the AC source 14. In this case, the output voltage of the AC voltage source 14 is preferably made higher in order to compensate the decrease in discharge for ion generation.

In the ion generating device which has been described with the first or second embodiment, the toner T is possibly deposited onto such a portion (non-image area) where no ions are to be deposited. This can be caused by the voltage applied to the third electrode 10. More particularly, when, for example, foreign matter is attached to the third electrode 10 and is contacted to the recording medium 1, an electric charge is injected to the surface of the recording medium 1 by way of the foreign matter since a voltage is applied to the third electrode 10. The electric charge attracts the toner T to the recording medium 1 in the non-image areas, thus providing a foggy background of the image.

Figure 5:
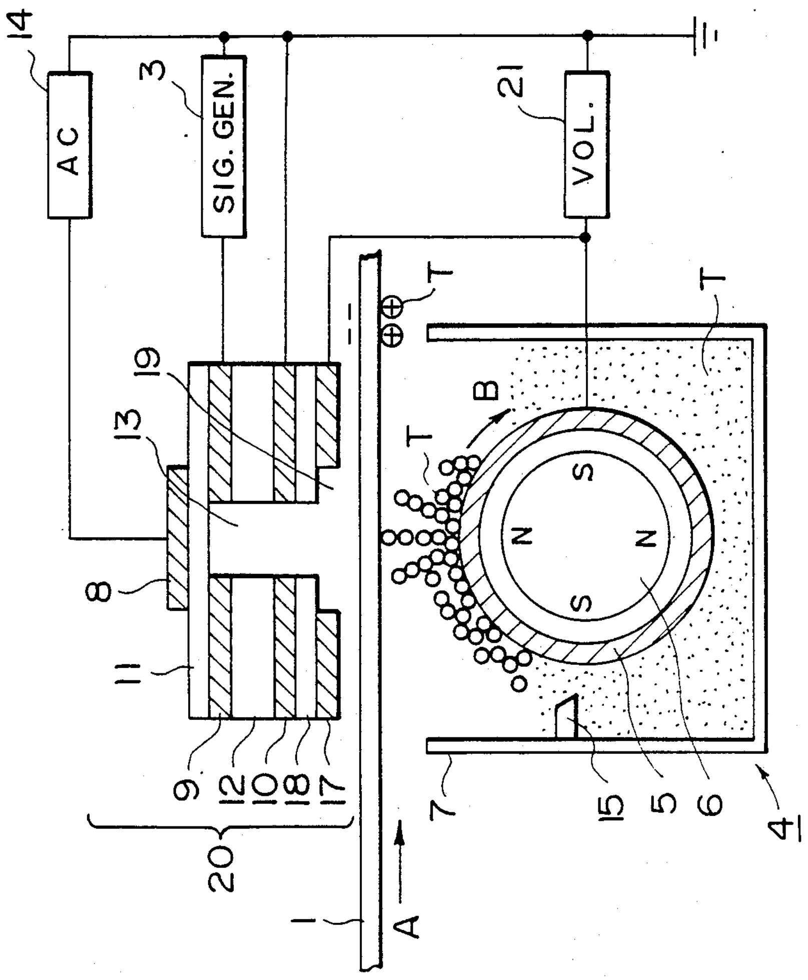
FIG. 5 is a cross-sectional view of an image forming apparatus according to another embodiment of the present invention.

FIG. 5 is a cross-sectional view of the image forming apparatus according to another embodiment of the present invention, wherein an ion generating device is used which is substantially free from the above-described foggy background.

The recording electrode assembly 20 of the ion generating device used in this embodiment, further comprises a third dielectric member 18 and a fourth electrode 17. The fourth electrode 17 is effective to prevent, whether or not the image signal voltage is applied, the potential difference between the third electrode 10 and the sleeve 5 from depositing the toner onto the recording medium 1 and therefore creating the foggy background. The combination of the fourth electrode 17 and the third dielectric member 18 is a Mylar sheet to which aluminum is evapolated. The thickness thereof is 100 microns. This is bonded to the third electrode 10 by an adhesive. The fourth electrode 17 is provided with apertures 19 each having a diameter which is slightly larger than the aperture 13 so as not to attract the ions existing in the aperture 13. Thus, the passage is formed from the second electrode 9 to the fourth electrode 17 by the apertures 13 and 19 in this embodiment.

In this embodiment, the first dielectric member 11 was made of mica having the thickness of 40 microns. Between the first electrode 8 and the second electrodes 9, an AC voltage having the frequency of 800 KHz and the voltage of 2.0 $KV_{p-p}$ (peak-to-peak voltage) was applied by the AC power source 14. To the second electrode 9, the voltage of $-200$ V is applied by the image signal generator 3 upon the image signal produced, while the voltage of 0 V was applied upon no image signal. The third electrode 10 was grounded. To the fourth electrode and the sleeve 5, a voltage is applied from the power source 21 so a to maintain both of them at substantially the same potential. Thus, the potential difference can be extinguished between the third electrode 10 and the sleeve 5. In this embodiment, 800 V was applied.

The image formation was actually carried out under the above-decribed conditions, and it was confirmed that the foggy background could be prevented and that sharp and clear images were provided. In the foregoing embodiment, the third electrode 10 was grounded. However, it is possible, for example, to ground the fourth electrode 17 and the sleeve 5 and to apply a DC voltage of $-800$ V to the third electrode 10, wherein $-1000$ V is applied to the second electrode 9 upon the image signal generated, while $-800$ V is applied thereto upon no generation of the image signal. With these voltage applications, sharp images without foggy background were formed.

The ion generating device of FIG. 5 has been described as having such apertures as shown in FIG. 2. However, the idea of FIG. 5 embodiment is applicable to the matrix type ion generating device as shown in FIG. 3 and 4. More particularly, the third dielectric member and the fourth electrode are provided, and substantially the same potential is established at the fourth electrode and the sleeve 5.

The image thus provided, may be transferred onto recording paper or the like (not shown) by known process of image transfer, such as pressure transfer, heat transfer, corona transfer or the like. When the recording medium 1 is transparent, the apparatus may be used as a projection type display. More particularly, the visualized toner image is projected as it is, by a mechanism having the function of a known overhead projector. The light of the overhead projector may be incident on the recording medium 1 having the unfixed toner image, or it may be incident thereon after the toner image is fixed by heat, for example.

Figure 6:
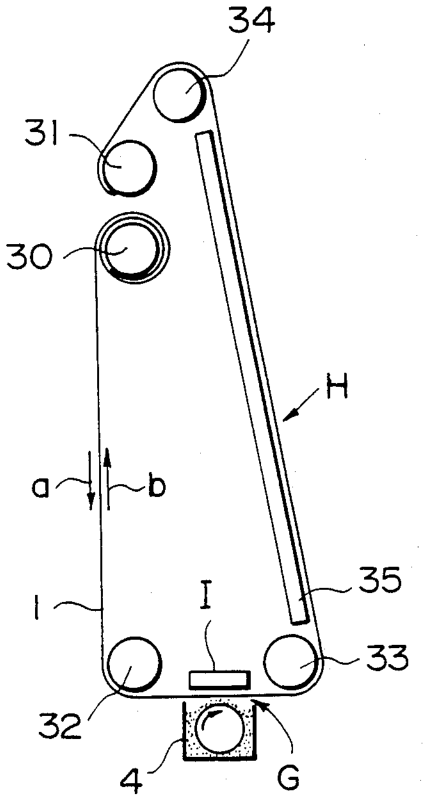
FIG. 6 is an image forming apparatus according to a further embodiment of the present invention in which the formed image can be displayed.

FIG. 6 is a cross-sectional somewhat schematic view of an apparatus according to another embodiment of the present invention wherein the visualized image can be displayed.

The recording medium 1 is wound at its one end on a first take-up roll 30 and at the other end on a second take-up roll 31. The recording medium 1 is entrained around guide rollers 32, 33 and 34. The recording medium 1 is movable in forward and backward direction shown by the arrows a and b, respectively, by a driving means (not shown). The apparatus comprises an image forming station G wherein an image is formed with toner, an image display station H where the image is displayed while the recording medium 1 is stopped and an ion generating device I which has been described in conjunction with FIGS. 2, 3, 4 and 5. During the image forming operation, the recording medium 1 is moved in the direction of the arrow a, and it is passed between the ion generating device I and the developing means 4 so that the image is formed thereon by the image forming station G in accordance with the image information. The recording medium 1 is moved further in the direction of the arrow a, and when the image reaches the image display portion H, the recording medium 1 is stopped to display of the image.

At the image display station H, a backing plate 35 is provided to maintain the recording medium 1 flat, the recording medium 1 is formed by thin film or the like. In order to avoid the backing plate 35 damaging the recording medium 1, the backing plate 35 has a surface of low friction, or it is contacted thereto under small pressure. When the recording medium 1 is white for reflection type display, white pigment or dye may be kneaded prior to producing the film, or white pigment or dye with binder resin kneaded therewith may be applied to the surface of the film.

After the image display is complete, the recording medium 1 is moved in reverse in the direction of the arrow b, and the toner image which is no longer desired, is erased in the manner described above. The recording medium 1, after the toner image is erased, is taken up on the first take-up roller 30. However, it is difficult to completely erase the toner image when viewed microscopically. Therefore, when the toner-removed surface is wound around the take-up roll, the toner particles can be deposited on the ion applying surface of the recording medium 1 for long periods of use of the apparatus. In consideration of this, the length of the recording medium 1 from the first take-up roll 30 to the image forming station is preferably larger than the length of the displayed image.

The described take-up system is not required, but an endless belt, for example, may be used. In this case, the recording medium may be moved only in one direction. Then, the recording medium is moved after finishing the display, and the image may be erased when the image to be erased comes to the image forming station.

When the recording medium is of an endless belt type, the positional deviation of the recording medium is integrated with the use of apparatus, but the above-described take-up type is free from such integration of the deviation since the deviation resulted in the forward movement is eliminated during the backward movement. Therefore, if the take-up type is employed, thin film can be used as the recording medium without occurrence of the positional deviation or wrinkle, so that stable image formation and image display are possible.

Figure 7:
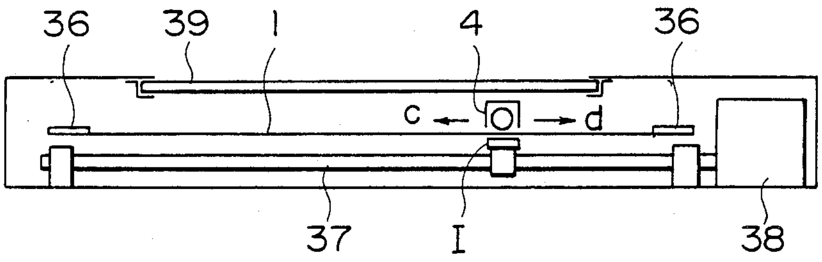
FIG. 7 shows a image forming apparatus according to a further embodiment of the present invention.
Figure 8:
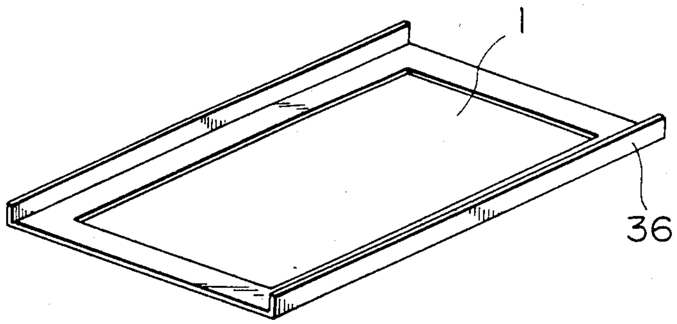
FIG. 8 is a perspective view of the recording medium used with the apparatus shown in FIG. 7.

FIG. 7 shows another example of the image display apparatus according to the present invention, wherein the recording medium 1 is stationary, while the ion generating device I and the developing device 4 are movable. The recording medium 1 is supported by a frame 36 as shown in FIG. 8 which is fixed. The ion generating device I is opposed to the recording medium 1, and the developing device 4 is opposed to the opposite side of the recording medium 1. The ion generating device I and the developing device 4 which together constitute an image forming means are movably mounted to a ball screw 37. The ball screw 37 is rotated by a motor 38, so that the ion generating device I and the developing device 4 are integrally movable in the directions indicated by the arrows c and d as shown in FIG. 7. The apparatus is provided with a display glass 39. The ion generating device I and the developing device 4 have the structures as have been described with the foregoing embodiments.

In operation, the ion generating device I and the developing device 4 are moved together in the direction c, and the image is formed during the movement. After the formation of the toner image, the ion generating device I and the developing device 4 are stopped at a position which is not seen through the display window 39, that is, the left-hand position in FIG. 7, so as to allow the entire display. After the displaying, the ion generating device I and the developing device 4 are moved together in the direction d, and during the movement, the image is erased so as to be prepared for the next image formation. The image formation and the image erasing may be performed in the same manner as have described hereinbefore.

In this embodiment, as for the recording medium 1, a polyethylene terephthalate film sheet of 18 microns thickness which is coated with 3 microns of paint including dispersed titanium oxide with acrylic resin binder to the opposite sides of the film sheet.

By making the recording medium stationary, thinner film, as compared with the case where the recording medium is movable, can be used without the positional deviation and wrinkle.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for forming an image on an image bearing member, comprising:

developing means provided on one side of the image bearing member and including a developer carrier for carrying developer;

ion generating means provided on the opopsite side of the image bearing member and opposed to said developing means through the image bearing member, said ion generating means including a first electrode, a second electrode, a third electrode so disposed that said second electrode lies between said first electrode and said third electrode, a first dielectric member between said first electrode and said second electrode and a second dielectric member between said second electrode and said third electrode, said second dielectric member and said third electrode having a plurality of corresponding apertures;

means for applying an alternating potential between said first electrode and said second electrode;

means for applying a signal voltage to said second electrode in accordance with image formation;

means for applying a predetermined voltage between said third electrode and said developer carrier;

means for causing relative movement between the image bearing member and both of said developing means and said ion generating means; and electrode means disposed between said third electrode and the image bearing member to prevent production of a foggy background.

2. An apparatus according to claim 1, wherein said apertures are arranged in a direction substantially perpendicular to the relative movement, and wherein the second electrode includes a plurality of electrode elements arranged in the same direction and corresponding to the apertures.

3. An apparatus according to claim 1, wherein the first electrode includes a plurality of electrode members, the second electrode includes a plurality of electrode members, the electrode members of the first electrode and the electrode members of the second electrode constituting a matrix, wherein said apertures correspond in position to cross-over points between the electrode members of the first electrode and the electrode members of the second electrode.

4. An apparatus according to claim 1, 2 or 3, further comprising means for displaying an image formed on said image bearing member.

5. An apparatus according to claim 4, wherein said apparatus is operable in a first mode wherein the signal voltage is applied to the second electrode of said ion generating means in accordance with image information, and said developing means forms a developed image, and is operative in a second mode wherein the signal voltage is not applied to the second electrode of said ion generating means in accordance with the image information, and said ion generating means discharges to said image bearing member the ions of a polarity opossite to that of the ions in the first mode, wherein said developing means erases the developer contributed for the image formation in the first mode and collects the developer.

6. An apparatus according to claim 5, wherein the second electrode and the third electrode of said ion generating means and said developer carrier are maintained at the same potential level in the second mode.

7. An apparatus according to claim 5, wherein said developing mean and said ion generating means are reciprocable relative to said image bearing member, and said developing means and ion generating means are relatively moved in a forward direction in the first mode, and are moved in the backward direction in the second mode.

8. An image forming apparatus for forming an image on an image bearing member, comprising:

developing means provided on a side of the image bearing member and including a developer carrier for carrying developer;

ion generating means provided on the opposite side of the image bearing member and opposed to said developing means through the image bearing member, said ion generating means including a first electrode, and a second electrode, a third electrode so disposed that said second electrode lies between said first electrode and said third electrode, a fourth electrode so disposed that said third electrode lies between said second electrode and said fourth electrode, a first dielectric member between said first electrode and said second electrode, a second dielectric member between said second electrode and said third electrode and a third dielectric member between said third electrode and said fourth electrode, said second dielectric member, said third electrode, said third dielectric member and said fourth electrode having a plurality of corresponding apertures;

means for applying an alternating potential between said first electrode and said second electrode;

means for applying a signal voltage to said second electrode in accordance with image information;

means for applying a predetermined voltage between said third electrode and said developer carrier;

means for maintaining said fourth electrode and said developer carrier substantially at the same potential; and means for causing relative movement between the image bearing member and both of said developing means and said ion generating means.

9. An apparatus according to claim 8, wherein said apertures are arranged in a direction substantially perpendicular to the relative movement, and wherein the second electrode includes a plurality of electrode elements arranged in the same direction and corresponding to the apertures.

10. An apparatus according to claim 8, wherein the first electrode includes a plurality of electrode members, the second electrode includes a plurality of electrode members, the electrode members of the first electrode and the electrode members of the second electrode constituting a matrix, wherein said apertures correspond in position to cross-over points between the electrode members of the first electrode and the electrode members of the second electrode.

11. An apparatus according to claim 8, 9 or 10 further comprising means for displaying an image formed on said image bearing member.

12. An apparatus according to claim 11, wherein said apparatus is operable in a first mode wherein the signal voltage is applied to the second electrode of said ion generating means in accordance with image information, and said developing means forms a developed image, and is operative in a second mode wherein the signal voltage is not applied to the second electrode of said ion generating means in accordance with the image information, and said ion generating means discharges to said image bearing member the ions of a polarity opossite to that of the ions in the first mode, wherein said developing means erases the developer contributed for the image formation in the first mode and collects the developer.

13. An apparatus according to claim 12, wherein the second electrode and the third electrode of said ion generating means and said developer carrier are maintained at the same potential level in the second mode.

14. An apparatus according to claim 12, wherein said developing mean and said ion generating means are reciprocable relative to said image bearing member, and said developing means and ion generating means are relatively moved in a forward direction in the first mode, and are moved in the backward direction in the second mode.

15. An apparatus according to claim 8, wherein said apertures of said fourth electrode have a diameter larger than the diameter of said apertures of said third electrode.

* * * * *

UNITED STATES PATENT AND TRADEMARK OFFICE

CERTIFICATE OF CORRECTION

PATENT NO. : 4,658,275

DATED : April 14, 1987

INVENTOR(S) : Haruo Fujii, ET AL.

It is certified that error appears in the above-identified patent and that said Letters Patent is hereby corrected as shown below:

COLUMN 1
Line 32, "2," should read --1,--.
Line 40, "develping" should read --developing--.

COLUMN 2
Line 41, "a" should read --an--.

COLUMN 4
Line 8, "(8)" should read --8--.
Line 67, "example polyester," should read --example, polyester,--.

COLUMN 5
Line 41, "(5)" should read --5--.
Line 59, "electrode" should read --electrodes--.

COLUMN 6
Line 45, "a" should read --as--.
Line 48, "as of" should read --as that of--.

COLUMN 7
Line 13, "evapolated" should read --evaporated--.
Line 32, "a" should read --as--.
Line 38, "above decribed" should read --above-described--.

CERTIFICATE OF CORRECTION

PATENT NO. : 4,658,275

DATED : April 14, 1987

INVENTOR(S) : Haruo Fujii, ET AL.

It is certified that error appears in the above-identified patent and that said Letters Patent is hereby corrected as shown below:

COLUMN 8

Line 27, delete "of".

Line 55, "may be" should read --may also be--.

Line 65, "resulted in" should be --resulting from--.

COLUMN 9

Line 35, "have described" should read --have been described--.

Line 41, insert --is provided-- after "sheet".

Line 58, "opopsite" should be --opposite--.

COLUMN 10

Line 43, "opossite" should be --opposite--.

Line 52, "mean" should be --means--.

Line 67, delete "and".

COLUMN 12

Line 17, "opossite" should read --opposite--.

UNITED STATES PATENT AND TRADEMARK OFFICE
CERTIFICATE OF CORRECTION

PATENT NO. : 4,658,275

DATED : April 14, 1987

INVENTOR(S) : Haruo Fujii. ET AL.

It is certified that error appears in the above-identified patent and that said Letters Patent is hereby corrected as shown below:

COLUMN 12

Line 26, "mean" should read -- means --.

Signed and Sealed this

Fifteenth Day of September, 1987

*Attest:*

DONALD J. QUIGG

*Attesting Officer* *Commissioner of Patents and Trademarks*